July 25, 1939.　　　　J. KIEFFER　　　　2,167,114
X-RAY DEVICE
Filed May 19, 1937　　　9 Sheets-Sheet 1

INVENTOR.
JEAN KIEFFER
BY A. T. Sperry
ATTORNEY

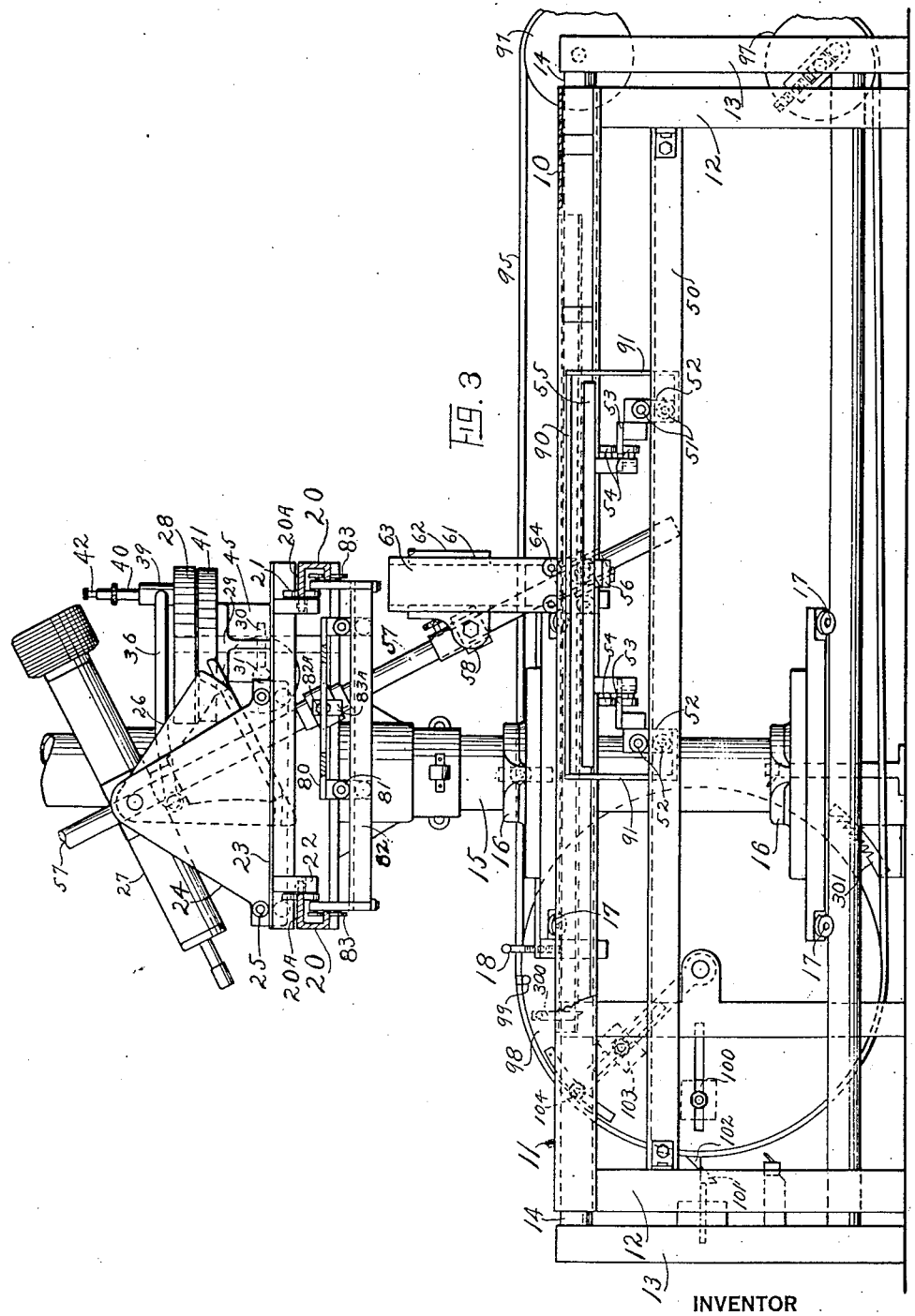

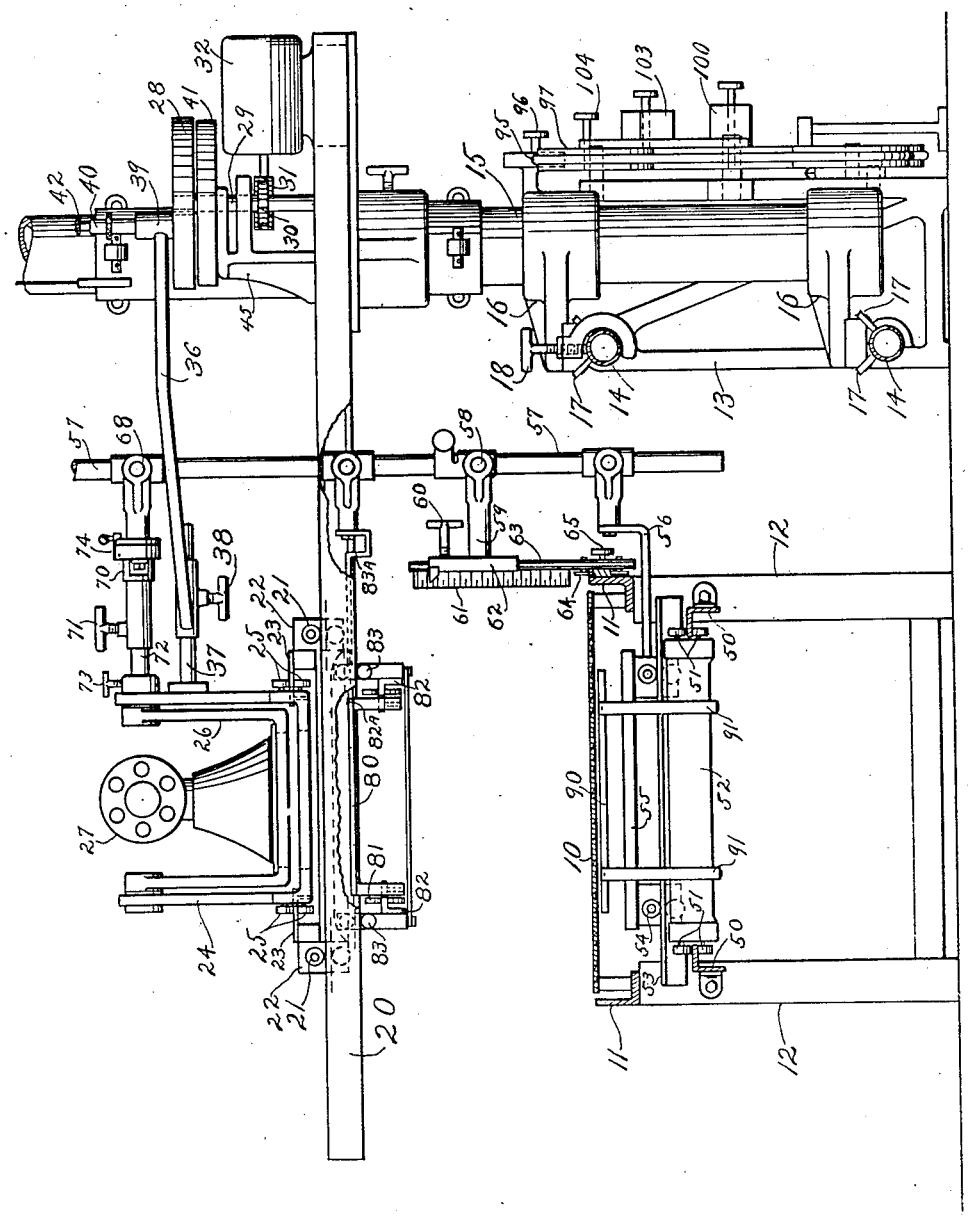

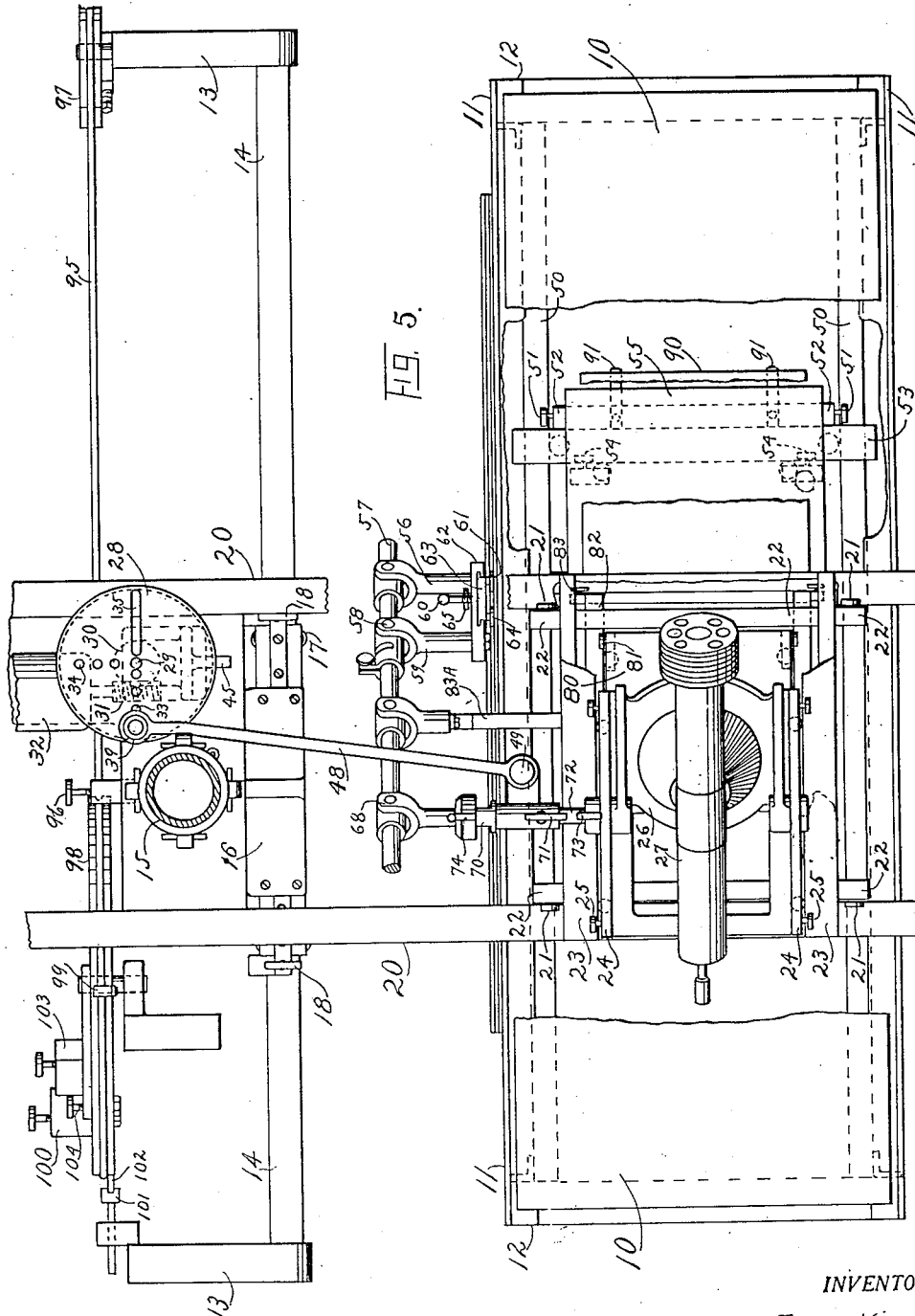

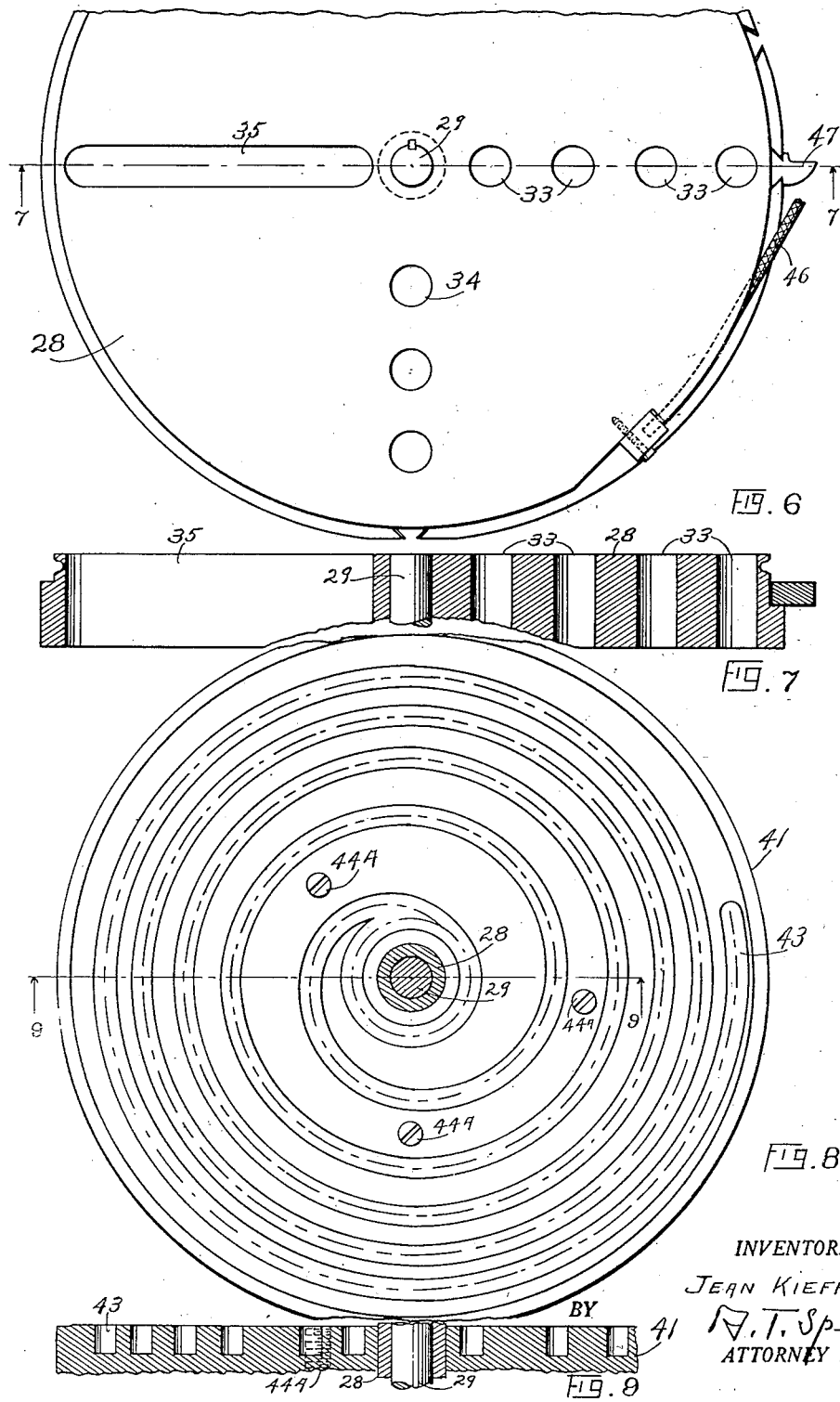

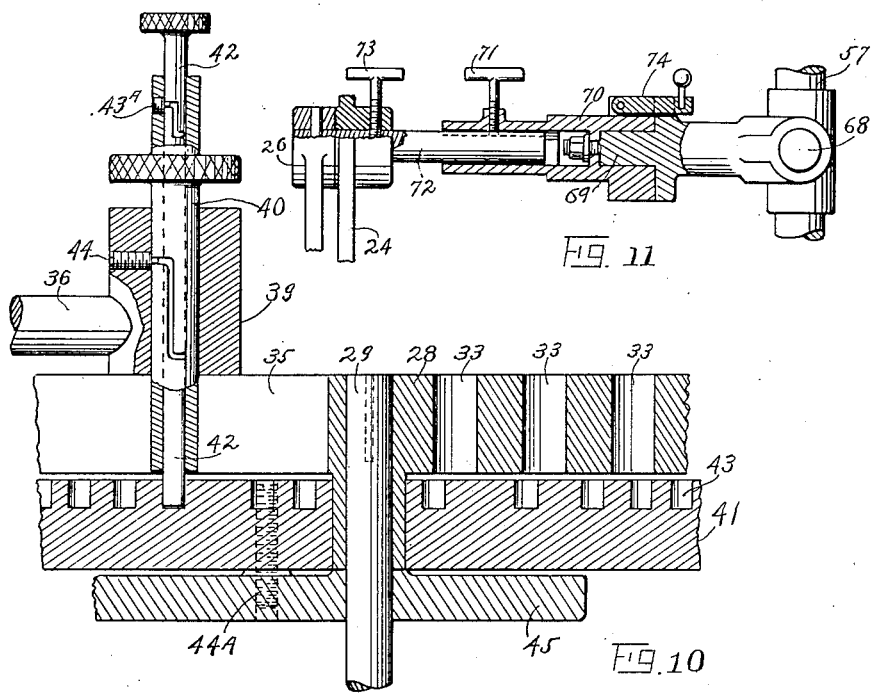
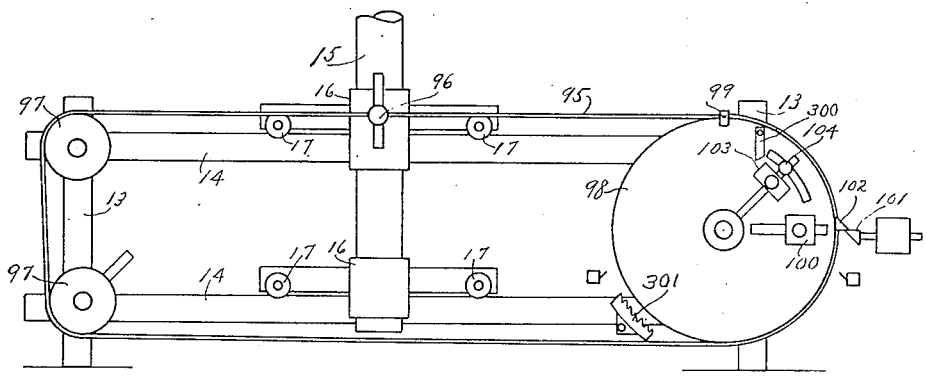

July 25, 1939. J. KIEFFER 2,167,114
X-RAY DEVICE
Filed May 19, 1937 9 Sheets-Sheet 7
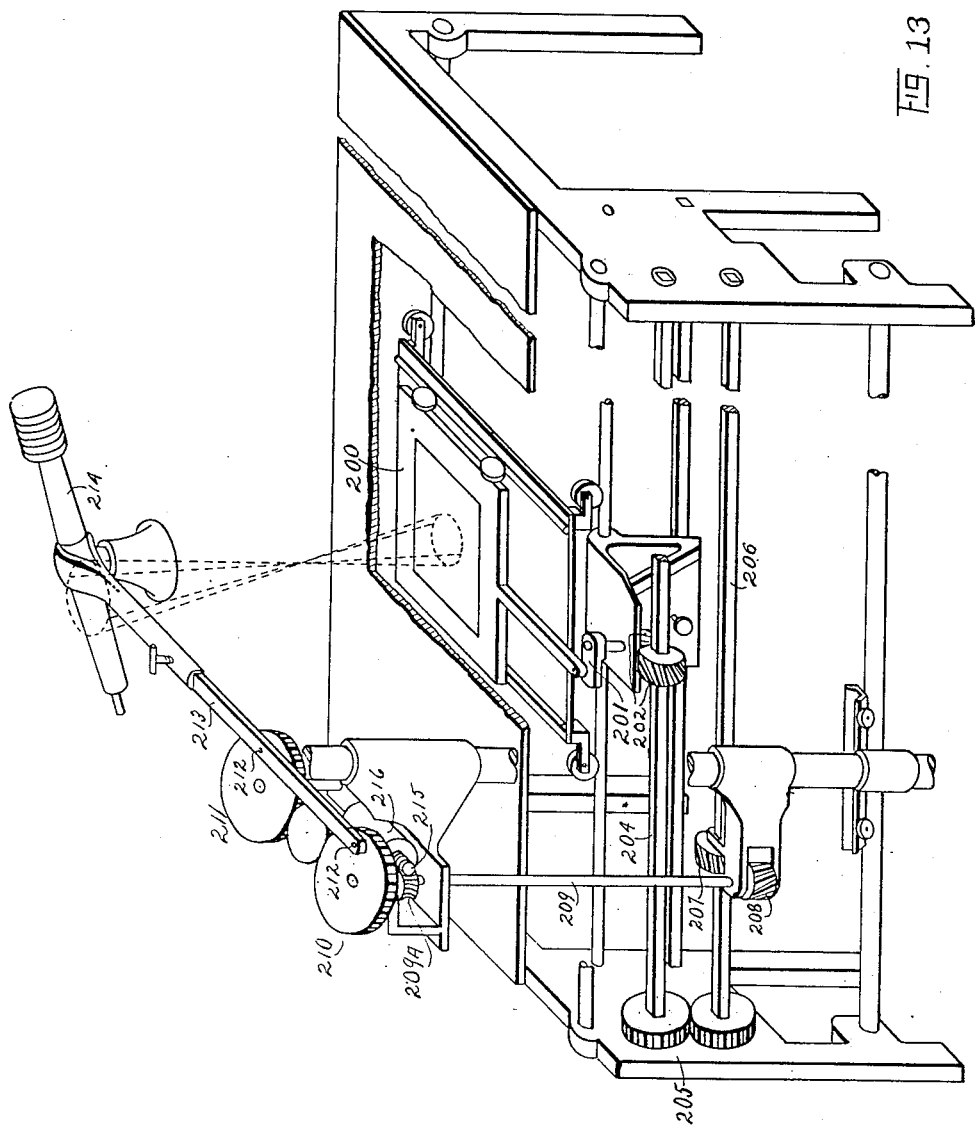
INVENTOR
JEAN KIEFFER
BY
ATTORNEY July 25, 1939.     J. KIEFFER     2,167,114
X-RAY DEVICE
Filed May 19, 1937     9 Sheets-Sheet 8
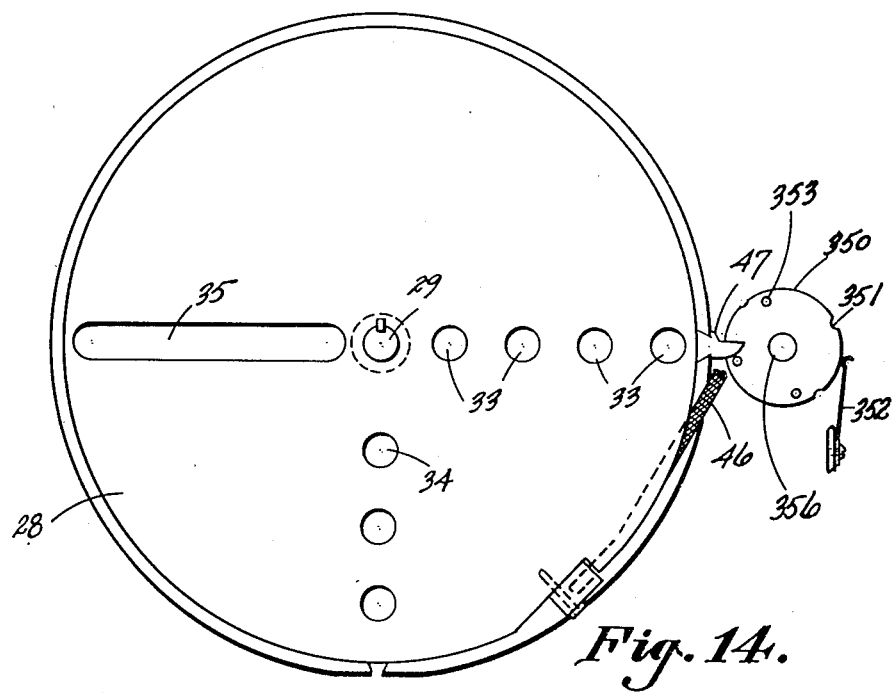
Fig. 14.
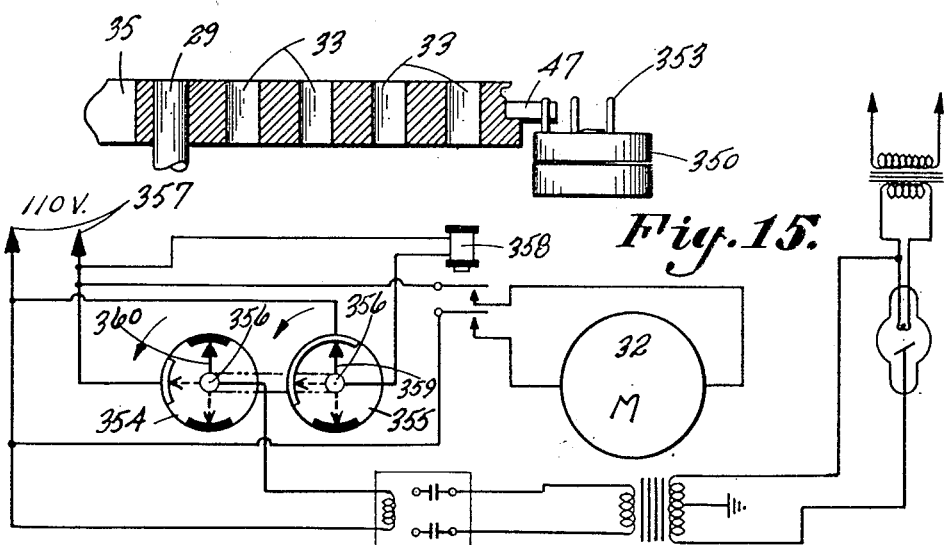
Fig. 15.
Fig. 16.
INVENTOR.
JEAN KIEFFER
BY Chester Tietig
ATTORNEY.

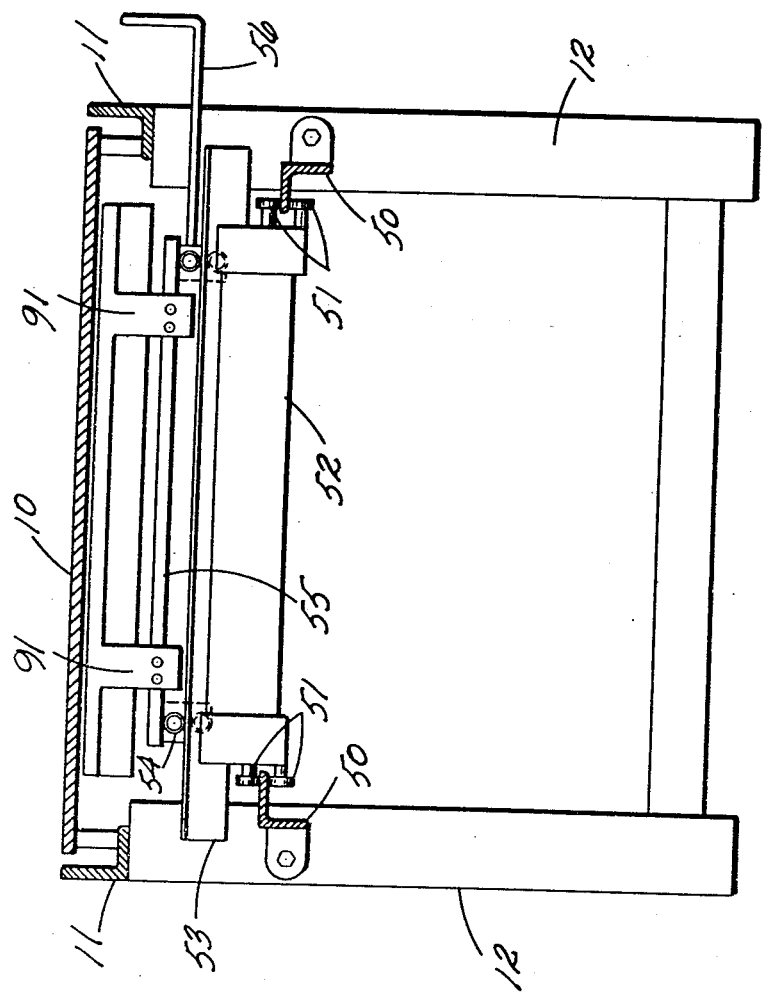

Patented July 25, 1939

2,167,114

UNITED STATES PATENT OFFICE 2,167,114

X-RAY DEVICE

Jean Kieffer, Norwich, Conn.

Application May 19, 1937, Serial No. 143,445

23 Claims. (Cl. 250—58)

This invention relates to X-ray devices and methods of technique.

The prime object is to provide an apparatus for and method of effecting the virtual focusing of X-rays.

The present invention is an improvement on, and a development of, the inventive concept which prompted my prior patent application, Serial No. 346,651, which matured into my patent, No. 1,954,321, dated April 10, 1934. The present invention, therefore, partakes of the objects, features and advantages set forth in my prior patent, and the specific objects stated therein are to be considered as among the general objects of this present invention.

Other and further objects of the invention include the accomplishment of the foregoing desiderata in a structurally competent mechanism which, while being simple in construction and operation, will be highly efficient and effective for the purposes herein set forth.

Another object is to provide a structure which is widely flexible, thus to render the device substantially universal, and operable in the practice of many various techniques. Many features of adjustability, variability and changeability are included as means for fully accomplishing this object.

Another object is to provide means for automatically giving certain moving elements of the device a certain predetermined movement, or series of movements, so as to accomplish specific results, such movements being those as may be dictated by the technique being employed, or by the skill and imagination of the operator for the accomplishment of special results.

Another object is to provide in a single machine for a wide choice and selection of the type of movements to be automatically imposed and to combine such selection with the ability to arrange the parts for no movement, or for hand manipulation only.

A further object is to provide for various combinations of movements and cycles of movement of the target and plate jointly, all using the plane of the object as a pivotal plane. This object is accomplished in a manner to also provide for numerous adjustments of the target and plate as a unit and individually both with respect to each other and with respect to the object.

A further object of the invention is to provide readily adjustable means by which a series of pictures of the same object may be taken and, in like manner, from different angles whereby the same may be used with a stereoscopic technique of viewing so as to minimize interference from other objects.

A further and important object of the invention is to provide means for coordinating the direction of the X-ray emanation with movements of the tube so that such rays may more efficiently pass in the predetermined trajectory desired.

Other objects and features of the invention will be apparent from a further consideration of the invention as hereinafter described.

In the drawings, which form a part of the present invention and which include detailed illustrations of certain embodiments of the present invention:

Figure 3 is a side elevation, partly in section, of a preferred structural arrangement of the invention.

Figure 4 is an end elevation, partly in section, of the structure of Figure 3.

Figure 5 is a top plan view of the structure of Figures 3 and 4.

Figure 6 is a detail top plan view of the rotating guiding plate for imparting movement to the actuating arm.

Figure 7 is a section taken on the line 7—7 of Figure 6.

Figure 8 is a detail view of the cam plate, or templet, which may be used with the guiding plate; the cam formed therein being in accordance with the curve of Figure 2.

Figure 9 is a fragmentary section taken on the line 9—9 of Figure 8.

Figure 10 is a detail view of the assembly of the parts shown in Figures 3 to 8.

Figure 11 is a detail view of one of the connecting links of the machine.

Figure 12 is a view illustrating the mechanism for moving the entire tube stand longitudinally of the table; and Figure 13 is a schematic view of a modification of the machine in which a gear mechanism is utilized as an alternative from the pivoted linkage system of that form of the invention shown in Figures 3, 4 and 5.

Fig. 14 corresponds to Fig. 6 but shows in addition electrical control means actuable by the rotating guide plate.

Fig. 15 corresponds to Fig. 7 with the addition of the same means added to Fig. 6 in Fig. 14, such means being shown in section.

Fig. 16 is a diagram of an electrical circuit controlled by the rotating guide plate and adapted to energize the X-ray tube at appropriate points in the mechanical cycle of the apparatus.

Fig. 17 corresponds to the table and associated parts shown in Fig. 4 with the difference that the diaphragm is arranged to partake of all of the movements of the plate holder.

In general terms, the primary object of all radiographic technique is to obtain a clearly recorded visualization of specific objects. This is among the objects of the present invention although it is to be clearly understood that the inventive concept is not limited to photographic work and may be readily applicable to fluoroscopic work, or to therapeutic treatment. While I do not wish to give any indication of limiting my invention to radiographic work, for the sake of clarity, brevity and simplicity, the form of the invention here shown, and described, is intended for such work primarily.

In the usual radiographic work now being done for the aid of the diagnostician, a fixed X-ray tube is arranged to emit from its target rays directed to a fixed object through which the rays, with varying degrees of intensity, pass and act upon a fixed plate, or film, on the other side of the body to be radiographed; the intensity of the rays passing through being determined by the type of material in the body. Thus, while normal tissue may impede the passage of the rays only slightly, a denser medium, such as bone, may retard the passage of rays so that the plate will have formed thereon the outline, or shadow, of the bone.

With this in view, it is obvious that difficulties are encountered when a radiograph of a body, having superimposed shadow forming parts, is taken.

From a consideration of the present specification, it will be seen that the advantageous features of the invention may have multifold practical uses in the industries, as well as in the medical field. It will be understood that the invention is not confined to medical use, and that the terminology herein used, which implies medical use, is not intended to restrict in any way the application of the invention to medicine. For example, the focusing effect herein provided for may find considerable usefulness in a wide variety of commercial enterprises.

Figure 1:
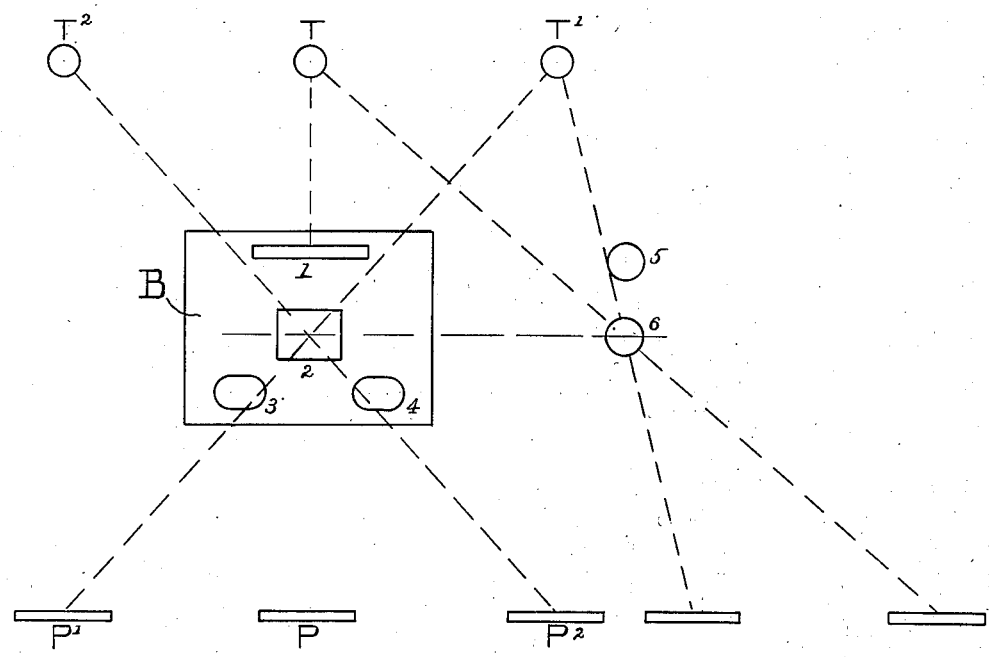
Figure 1 is a diagram illustrating the principles underlying the present invention.

Referring now to Figure 1 of the drawings, I provide a virtual focusing of the rays on a specific object in a body by means of simultaneously and coordinately moving the target and plate.

If, for instance in Fig. 1, B represents a body having objects 1 and 2 embedded therein, it will be obvious that a radiograph, taken by conventional technique with the target T and the plate P fixed, will result in a shadow of only the object 1 since its area exceeds that of the object 2; and this would be so regardless of the relative positions, one above the other, or the distance apart in the body. Only in the event that the larger body 1 was less opaque to the X-rays would a visualization of the smaller object 2 take place and, even in such an event, complications and indistinctness might result.

However, if the target were set at the right position T1 and the plate set at its left position P1, the object 2 would cast its full shadow independent of the object 1. However, since we are dealing with highly complicated structure, other objects such as the left hand object 3 might be found to obstruct a clear radiographic representation of the object sought for visualization.

The above complications would also be obtained should the target and plate be set in the positions T2 and P2, respectively, in which instance an object 4 might complicate matters.

If, however, a composite of the positions, P, P1 and P2 were taken, we would find that the object 2 would stand out by virtue of the fact that, in all the positions shown, it is in the focal range of the X-rays. Difficulties would, however, lie in forming separate composite radiographs because the various objects would each cast their shadow and the result of their composition would tend towards a fully shadowed plate. Now, if we combine the idea of a composite picture with the well-known phenomenon of blurring, due to motion in photographic work, we can then achieve more valuable results. It will be noted from Figure 1 that the distances of the target from the plate from the objects 1, 3 and 4 are different for each of the positions T, T1 and T2. The relation of the distance of the target to the object and of the object to the plate is constant, this being as a result of the fact that the plane of object 2 is used as the pivotal point for the movements of the target and plate; and that the target and plate move in fixed planes parallel to one another and parallel to the object plane selected.

From this it can be seen that, by selecting the desired object to be radiographed and by using the location of that object to determine the plane in which the pivotal point for the target and plate is located, said plane being parallel to those in which the tube and plate move, objects on a plane other than the selected one will move, with respect to the target and plate, as the position of the target and plate changes and such movement will blur their shadows and render them less visible on the record plate, this blurring being proportional to their distance from the selected plane, and a clearer record of the desired plane in which the object is located will result.

An important feature of the present invention is the fact that the target and the plate move in parallel planes as distinguished from movement in a spherical, or circular, arc of which the object is the center. It is, of course, true that movement in a spherical, or circular, arc, with the object as the center, would maintain the target and the plate distances, with respect to the object, equal at all times and that a variation follows from moving in a plane as shown. It is to be noted, however, that such variations do not change the target to plate distance ratio with respect to any object in the pivotal plane.

By reference to Figure 1 and the objects 5 and 6, it will be noted that, with reference to the object 6 in the plane of the object 2, the same characteristics of focusing take place, while, as to the object 5 out of the plane of the object 2, the variation in the target and plate distances is so great as to preclude a focusing and thus the object 5, similar to the object 1, will not be clearly reproduced on the plate. By this arrangement, it will be apparent that the apparatus has the unique characteristic of being able to accomplish the virtual focusing of the X-ray at any place in a selected plane.

Referring now to the illustrations of a preferred structural arrangement of the invention, reference may be had to Figures 3, 4 and 5 in which a normal X-ray table 10 is supported on a frame 11 having conventional uprights 12. Adjacent the table and to the right in Figure 4 is a tube stand support 13 which includes longitudinally extending upper and lower rails 14 which slidably support the tube stand. The tube stand itself includes a vertical tube stand post 15 and upper and lower arms 16 which engage the rails 14 by antifriction rollers 17, the arrangement being such that the entire tube stand may be moved longitudinally of the table for setting the tube and plate in proper position with respect to that portion of the anatomy of which a radiograph is desired. A threaded locking element 18 is provided so as to secure the tube stand, with respect to the table, at any desired position. As will be hereinafter pointed out, this arrangement permits of a movement of the entire tube stand, with respect to the table, in conjunction with the pivotal movement of the plate and tube as well as independently thereof. Means for moving the tube stand longitudinally of the table is shown in detail in Figure 12 and will be hereinafter further discussed.

Extending outwardly over the table from the tube stand post 15 are transverse rails 20 substantially U-shaped in cross-section as seen in Figure 3. Between the upper flanges 20A of the rails there is mounted, for reciprocatory motion by means of rollers 21, a transversely movable carriage 22 having cross-rails 23. Upon the cross-rails 23 of the transversely movable carriage 22 is mounted, for sliding movements over the rails 23, a U-shaped bracket 24, its rollers 25 engaging the rails 23 to guide the same thereon.

By this arrangement it will be seen that, through transverse movement of the carriage 22 with respect to the table 10 and cross-wise movement of the bracket 24 with respect to the carriage 22, both transverse and longitudinal movement of the bracket with respect to the table may be achieved and, since such movements may be simultaneous, they may be compounded to give any desired movement to the bracket, such, for example, as the spiral movement hereinafter discussed, it being, of course, understood that this is only one of an indefinite variety of movements which may be imparted to the bracket.

The upstanding inverted V-shaped sides of the bracket 24 form trunnion bearings for a rockable tube cradle 26 which may be held rigid with the bracket, or which may be rocked on its trunnions in synchronism with the movement of the bracket as desired. A conventional X-ray tube 27 is mounted therein. With relation to the rocking of the tube cradle, reference may be had to Figure 11 and to the subsequent description thereof hereinafter to be found.

For imparting motion to the bracket 24, reference may be had to the structure in Figures 3 to 10, inclusive. While various instruments may be used for imparting various types of motion, a preferred device includes a rotary table 28 or cam which is keyed to a shaft 29 carrying a gear 30 which is meshed by a driving gear 31 rotated by a motor 32. The table 28 is provided with a series of apertures 33 and 34, the radial distances of the apertures 33 being intermediate the radial distances of the apertures 34 so that the two sets together provide for a selection of apertures of varying radial distances in the center of the rotary table 28. The rotary table 28 is also provided with an elongated radially extended slot 35, the slot 35 and apertures 33 and 34 being adapted to cooperate with a pin carried by the end of a link member 36 which may be adjustably attached to a projecting arm 37 of the bracket 24; the connection being secured by a threaded securing member 38. In view of the fact that the connection between the link 36 and the member 37 is a fixed connection without a swivel, it will be seen that the exact motions imparted to the table and the link 36 will be duplicated by the carriage. It is important to note that the connection for moving the bracket from the rotary table is adjustable so that a pair of radiographs of the same object can be taken with the bracket set at different distances from the rotary table so as to include two pictures taken in like manner but from different angles whereby a streoscopic study of the radiograph may be resorted to. It will be noted, of course, that this adjustment does not interefere with the motion imparted to the bracket from the rotary table.

To accomplish a similar purpose, but with angulation longitudinal of the table, the entire tube stand assembly may be moved from end to end of the table and a pair of radiographs may be obtained to be combined and stereoscopically viewed.

With reference to Figure 10, it will be noted that the link 36 is provided with a head 39 through which may move a connecting pin 40, the arrangement being such that, when the lower end of the pin 40 is within one of the apertures 33, rotary motion will be imparted to the head 39, which will be imparted through the link 36 to the bracket 24 and thus to the tube 27.

For imparting other than the simple rotary motion, there is provided a cam plate, or templet, 41, as shown in Figures 8, 9 and 10, which may have formed therein any type of groove. A groove 43 formed in a parabolic type of curve, as shown in Figure 2 of the drawings, is illustrated in Figure 8.

Figure 2:
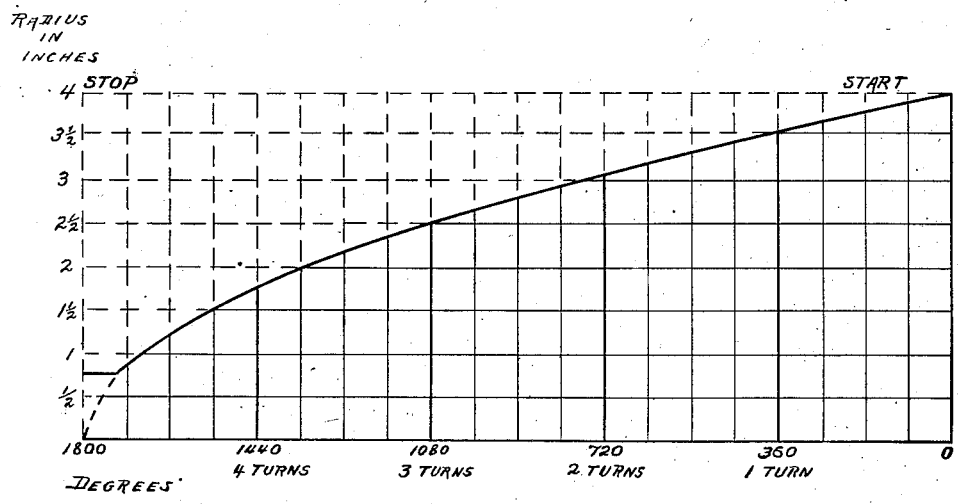
Figure 2 is the generatrix of the curve of the templet cam illustrated in Figure 8 and showing one preferred path of movement for the target and plate.

In order to insure a consistency in the amount of ray impingement comparable to the amount of territory over which the rays move, I have found that the use of a particular spiral, as indicated in Figures 2 and 8, is desirable. With the pin 42 inserted at the outer point of the groove of the spiral and with the operating disk rotating at a constant rate of speed, it will be obvious that with a plain, or Archimedean, spiral, the duration of the impingement of the rays during any revolution for any given surface will increase as the spiral approaches the center. To overcome this possible source of error in the finished plate, I have found that a spiral of the type shown in Figure 2, which is calculated so that the path of the target travel is such that the change in the area of the segments swept by the radius vector connecting the center of the target with the center of its movement is substantially equal for consecutive equal intervals of time. Obviously other types of curves may be utilized and various compound movements may be attained for accomplishing specific means.

Referring again to Figure 10, it will be seen that the pin 40 is hollow and extending therethrough it a pin 42 which may be longitudinally adjusted through the pin 40 and retained in its adjusted position through the bayonet connection shown at 43A, which is similar to the member 44 used in connection with the pin 40. When it is desired to move the bracket in accordance with the templet of the type shown, the pin 40 is inserted in the radial slot 35 of the table and the pin 42 is extended therethrough to engage the templet groove 43, it being, of course, understood that the templet is secured against rotation as by means of screws 44A to a bracket of the tube stand noted at 45. With the parts arranged in this manner, as the table is rotated, the link 36 will be moved in accordance with the movement of the pin 42 in the groove 43 and the movement of the bracket may thus be regulated in accordance with any desired predetermined pattern. The rotating table may also be utilized to impart a straight, transverse movement of the bracket with respect to the table by attaching thereto a cord as shown at 46 in Figure 6, the arrangement being such that, as the table is rotated, the cord will be drawn around the table, thus to move the bracket toward the tube stand. In considering the table, as shown in Figures 6 and 7, it will also be noted that the table may be provided with adjustable projections 47 which may be arranged to actuate the switch of the actuating motor, thus to give automaticity to the operation of the device. In this connection, it will be pointed out that, since the device may be provided with many various types of automatic control circuits, which form no part of the present invention, it is believed sufficient to point out that cams, such as the cam 47, may be employed for such purposes.

As an example of one construction by which such a cam will provide automaticity Fig. 14 illustrates the same cam shown in Figs. 6 and 7 with the addition of an electric switch in operating relation to a control circuit.

In Fig. 14 besides the elements shown in Figs. 6 and 7, there is a rotatable switch 350 having a plurality of notches 351 about its periphery, into which a spring indexing finger 352 is adapted to seat. Projecting upwardly from the switch body, there are a number of contact pins 353 adapted to engage cam 47. The switch 350 is divided into top and bottom portions and it is only the top portion bearing the pins 353, which is rotatable.

As will be seen in Fig. 15, cam 47 is able to engage one pin 353 at a time, so that a rotation of 90° is imparted to the upper body of switch 350.

Fig. 16 which is a more or less diagrammatic electric circuit showing the circuits controlled by switch 350, shows this switch by two symbols 354 and 355, the arrows indicating the direction of rotation.

The switch is of the type in which two contact arms at two levels extend from a central shaft 356, thereby making the switch a two deck drum switch. Contact is between the arm and the interior of the lower cylindrical body. The interior of this body bears the two sets of contacts 354 and 355 which are shown by symbols in Fig. 16. It is with these that the contact arms make separate electrical connection.

In Fig. 16, 110 volts is provided from service taps 357. The lower set of contacts 355 is in series with a relay 358 and controls the operation of motor 32. The upper set of contacts is in series with the X-ray tube energizing circuit.

In operation, the first position is the one shown in Fig. 16 in which the lower contact arm 359 is in a position to energize relay 358. This causes the motor 32 to rotate the table 28, thereby moving cam 47. Upon completion of the first predetermined amount of rotation, cam 47 pushes one of the pins 353, 90° from its previous position, thereby moving contact arm 359 and the upper contact arm 360 through 90°. In the resulting position motor 32 still operates and the X-ray circuit is completely energized. Following the next complete revolution of table 28, cam 47 again engages another pin 353, resulting in a further 90° rotation of contact arm 359 and 360. In this position both the X-ray energizing circuit and the circuit for relay 358 are open and operation therefor ceases.

By varying the position of pins 353 and the corresponding contacts in the switch body, a large number of combinations of movements can be had.

Means for reciprocating the bracket transversely of the table, without imparting thereto a longitudinal movement with respect to the tube stand, may be provided, as illustrated in Figure 5, in which the link 36 is substituted by a pitman 48 which, by having a swivel connection with respect to the rotary table 28 and at 49 to the arm 37, a rotary motion of the rotary table 28 is transmitted as a simple, reciprocating motion to the bracket 24, this bracket being locked by suitable means, not shown, to cross-rails 23 to prevent motion of the bracket along these rails.

In connection with the tube support and the mechanism for moving the same, it will be understood that the invention contemplates the use of such an arrangement, either with or without the use of a plate, or film, or the equivalent of a sensitized medium for the reception of radiographic impressions. For instance, the movement of the tube may be carried out in the practice of X-ray work in order that the intensities of the rays may be centered on a given internal portion of the anatomy without causing a corresponding intensity of rays at any point on the surface. However, in that form of the invention here shown, I provide a plate holder together with means for moving the same synchronously and in opposite direction to the movement of the tube in such a manner as to maintain the ratio of the tube to the object distance with the object plate distance so that objects, other than the one desired to be radiographed, will, by a lack of such maintenance of ratio, be blurred so as to minimize their interference with a clear radiographic representation of the object desired.

To carry out such a movement, I provide, only on the uprights 12 of the table, longitudinally extending brackets 50 which have mounted thereon, by rollers 51, a longitudinally movable frame 52 which, in turn, carries transverse tracks 53 and they also have mounted thereon, by rollers 54, a plate holder 55 which is secured through a bracket 56 to the lower end of a pivot link 57 which is adjustably pivoted as at 58 to a vertically adjustable arm 59, which may be secured in its adjusted position by a hand screw 60; a calibrated plate 61 being fixed adjacent the arm so that the plane of pivoting for the arm 59 may be radially determined. The arm 59 is carried by a sleeve 62 mounted upon an upright 63 secured to the rail 11 and longitudinally movable thereon by rollers 64; a threaded element 65 being provided for securing the upright 63 in its longitudinally adjusted position. The upper end of the pivot link 57 is secured to the bracket 24 by a coupling, which may be of the specific structure illustrated in Figure 11, and includes a pivoted gimbal connection 68 which terminates in a stud 69, having attached thereto for rotary movement with respect to the stud, a sleeve 70 carrying a threaded member 71 which is adapted to secure the sleeve 70 to a stud 72 secured to the tube cradle 26 and passing through the bracket 24; a hand screw 73 being provided through the trunnion aperture of the bracket 24 whereby it may be applied to the stud 72 to prevent rocking movement of the stud and the tube cradle.

The above arrangement also includes a pivoted detent 74 which may be moved to the position shown in Figure 11 to lock the gimbal connection and the sleeve 70 together so as to impart to the sleeve oscillatory movement from the gimbal member and, when so applied, the hand screw 73 is released and rotary movement will be imparted through the sleeve 70 to the stud 72. Thus, as shown in Figure 3, the arrangement for tilting the tube is maintained, at all times, in such a position so as to discharge its central rays in a plane parallel to the axis of the link 57.

With the coupling shown in position, as in Figure 11, it will be seen that movement imparted to the bracket 24, and thus to the cradle 26, will be directly and faithfully imparted to the upper end of the link 57 and such movement will likewise be imparted to the plate holder 55; the movement of which will, by virtue of the intermediate pivoting of the link 57, be directly opposite and proportional to the movement of the tube. Thus, the arrangement will carry out the method as discussed in connection with Figure 1.

In order to reduce X-ray impingement upon a body, other than that which is effective on the plate and thereby to assist in the focusing and to aid in the reproduction of a clear radiograph by elimination of secondary radiation, an aperture shield 80 is provided in combination with the tube holder. The shield 80 is mounted on rollers 81 which ride a longitudinally extending bracket 82 which, in turn, is supported for transverse movement by rollers 83 to insure movement on the lower flange of the rails 20. The shield 80 is directly attached, as at 82A, by a gimbal bracket 83A to the link 57 and thus the shield will partake of the movements of the tube, it being understood, of course, that the shield is not pivotally mounted as is the tube; the connection thereof with the link being such as to preclude the transmission to the shield of the tilting movement applied to the tube. Thus, as noted in Figure 3, the aperture of the shield will, at all times, be in line of ray impingement from the tube to the plate, but the shield will prevent the impingement of unnecessary rays as aforesaid.

The diaphragm of the "Bucky" type may also be applied over the plate holder 55. While it may be desired, in some instances, to maintain the diaphragm stationary, or in other instances, to have it moved with the movement of the plate holder, I have found it preferable to have the plate diaphragm move only with the longitudinal movement of the plate holder and remain stationary with respect to the transverse movement thereof and, therefore, I provide an arrangement in which a diaphragm 90 is supported by uprights 91 carried by the frame 52. Thus the diaphragm will move with the longitudinal movements of the frame, but will be stationary with respect to the transverse movements of the plate holder 55 on the frame 52.

It will be preferable at times, when the machine is also to be used for conventional radiography, to have a conventional type of "Bucky" diaphragm with its conventional actuating mechanisms mounted on the movable plate carrier itself as shown in Figure 17 so as to partake of all the movement of the plate; the diaphragm support remaining stationary in relation to the plate, and the grid moving with a translatory movement across the plate surface in the conventional method.

The present invention also contemplates the provision of automatic means for imparting longitudinal motion to the entire tube stand and tube holder, the shield, the plate holder and all the associated mechanisms. Such movement may be for merely adjusting the parts with respect to the portion of the anatomy of which a radiograph is desired, or such movement may be in conjunction with coordinating motions between the tube and plate, or with the tube and plate stationary with respect to each other.

In order to secure such movement of the tube stand, the same is mounted on the rails 14 through roller elements 17, as aforesaid, and the hand screw 18 is released and the threaded element 65 is also released so as to permit the member 63 to move longitudinally of the table with the movements of the tube stand for purposes of adjusting the whole assembly in respect to the body radiographed. When the hand screw 18 only is released and the member 63 is immovably secured to the rail 14 by the threaded element 65, any motion of the tube stand along the rail 14 will result in a motion in opposite direction of the plate holder 55, this movement being transmitted through the pivotal link 57 and being of the nature previously set forth, assuring that objects in the pivotal plane of the connection 58 will be sharply recorded.

It is to be noted that longitudinal motion of the tube stand along the table may be combined with any predetermined motion of the bracket 24 imparted by the rotary table 28 so that partial displacement of the target will be a composite of both motions and that the motion of the plate holder 55 will also be such as to maintain the focusing action previously described.

To carry out automatic movement of the tube stand for predetermined distances, I have provided a cable, or belt, 95 which may be releasably secured to the tube stand by a securing screw 96. The belt 95 passes over a pair of end pulleys 97, one being adjustable (see Figure 12), and around a large end pulley 98 which is rotatably mounted on the supporting frame of the tube stand. The cable, or belt, is secured to the pulley 98, as at 99, whereby rotation of the pulley will impart movement of the cable. The pulley 98 is provided with a radially adjustable counterweight member 100 which, by radial adjustment, may vary the force exerted on the cable 95 when the pulley is turned. The pulley may be secured in its normal position, as shown in Figure 12, by a catch member 101 which engages a cooperating catch member 102 on the pulley. When the catch member 101 is retracted, the counter-weight 100 will cause the wheel to turn in clockwise direction bringing the tube stand toward the right in Figure 12.

In order to compensate for the friction losses in the tube support, a second, radically adjustable, counterweight 103 is provided for the pulley; the same is not only adjustable radially, but may be arcuately adjusted as by an adjusting screw 104 extending through an arcuate aperture in the pulley. This arrangement is thus adjustable in accordance with the necessary force required for moving the tube, and is adjustable to predetermine the point at which the motion of the tube support shall stop; a catch member 300 engaging a ratchet 301 and holding the support at that point and preventing backward movement until willfully released.

From a consideration of the foregoing specification, taken in conjunction with a study of the drawings and diagrams, it is believed that a thorough understanding of the structure and operation of the invention will be apparent to those skilled in the art. Suffice it, therefore, to say that in operation the motor 32 may impart rotary, reciprocating or an established type of motion to the bracket 24 whereby the tube will be moved in its plane in accordance with such motion, and such movement will be imparted to the link 57 and to the plate holder. The plate diaphragm may be caused to move in accordance with such movements, but only longitudinally; and the shield 80 may also be caused to move with the movements of the tube; the tube may also be caused to rock so as to maintain the central beam of the emanation in the same plane with the connecting link; the pivoted point of the link may be adjusted so as to select the plane on which the rays are focused. Such movements may be independent, or in conjunction with the longitudinal movement of the whole tube stand and the associated parts.

Throughout the whole device, adjustability has been provided for. The machine is universal in that various types of movements may be carried out, and various instrumentalities are arranged for independent operation and adjustment. In order to illustrate that this present invention is not confined to the specific structural details herein set forth, by way of illustration, which, however, have been found to be commercially successful as herein indicated, reference may be had to Figure 13 which illustrates a gearing arrangement which avoids the link 57 and which will carry out a circular synchronous movement of the tube and plate.

In this arrangement, a plate holder 200 is moved by a crank 201 operated by gears 202 which, in turn, are operated from a shaft 204 through gears 205 and a shaft 206. The shaft 206 also carries a gear 207 meshing with a gear 208 on a vertical shaft 209, the upper end of which carries a worm gear 209A meshing with a worm 215 which may be driven by a motor 216. The upper end of the shaft 209 carries a gear 210 acting as a crank which, by intermediate gearing, rotates with it a companion gear crank 211. The gear 210 and gear crank 211 have crank pins 212 which carry a tube holding arm 213, supporting at its end a tube 214. By such an arrangement, it is obvious that, if the proper ratio between the gears for moving the plate and the gears for moving the tube is maintained so that both rotate with equal angular speed and the cranks placed at opposite positions, the tube and plate will be caused to move oppositely in circular manner; and, by suitable adjustment of the eccentricity of the linkage of the crank 201, the focal plane may be selected and the movement referred to in connection with Figure 1 may be carried out.

It is, therefore, obvious that the present invention is not limited to the specific structural details herein illustrated, and numerous changes, modifications and the full use of equivalents may be resorted to in carrying out the present invention without departing from the spirit and scope of the appended claims.

In the claims the term "opposed movement" or "opposite movement" has been used in reference to the simultaneous movement of the tube and plate. These and like terms are resorted to for the purpose of brevity and clarity and may be construed as meaning that while the movements of tube and plate are similar in path of travel, they are at all times 180 degrees out of phase and thus at any given point in any cycle of movement of the tube and plate will be found on opposite sides of a line extending perpendicularly through the center of the plane to be visualized and that each will be in a plane common to both which passes through such perpendicular line. The ratio of the distance of the tube from the extension of such line to the plane of movement of the tube and the like distance of the center of the plate will be constant during any given cycle of movement. In applying this terminology to Figure 1 it means that the ratio of distance $T-T^1$ to $P-P^1$ will always be (during any point in any given cycle) the same as the ratio $T-T^2$ to $P-P^2$.

Having set forth the nature of my invention, what I claim is:

1. In an X-ray machine, an X-ray tube holder mounted for motion in a single plane, a plate holder mounted for movement in a parallel plane and means for automatically and simultaneously imparting to said tube holder and said plate holder a predetermined cycle of similar but opposite spiral motion within their planes.

2. In a device of the character set forth, an X-ray tube support, a tube holder movably mounted on said support, a plate support, a plate holder movably mounted on said plate support and automatic means for simultaneously moving said tube holder and said plate holder in opposite predetermined spiral paths in planes parallel one to another.

3. In a device of the character set forth, a tube holder mounted for movement in a given plane, a plate holder mounted for movement in a parallel plane, means connecting said tube holder and said plate holder for imparting simultaneous opposite movement thereto, means for imparting movement to said connecting means, a fixed element having a guide path, a guide path engaging element carried by said means for imparting movement whereby upon engagement of said engaging element with said guide path and application of power to said means for imparting movement, said tube holder and said plate holder will move in a predetermined path conforming to said guide plate.

4. In a device of the character set forth, a tube holder mounted for movement in a given plane, a plate holder mounted for movement in a parallel plane, means connecting said tube holder and said plate holder for imparting simultaneous opposite movement thereto, means for imparting movement to said connecting means, a fixed element having a spiral guide path, a guide path engaging element carried by said means for imparting movement whereby upon engagement of said engaging element with said guide path and application of power to said means for imparting movement, said tube holder and said plate holder will move in a predetermined spiral path conforming to said guide plate.

5. A device as set forth in claim 1 in which the spiral path is of such configuration that the density of rays will be uniform over the entire receiving surface.

6. A device as set forth in claim 1 in which the spiral is an approximate parabolic spiral.

7. A device as set forth in claim 1 in which the spiral is one in which the separation between turns is such that the difference of the square of their distance to the center is approximately constant.

8. A device as set forth in claim 1 in which the spiral is of such configuration that the area of the segment swept by the radius vector connecting the center of the X-ray tube target with the center of its movement is substantially equal for consecutive equal intervals of time.

9. In an X-ray apparatus, including a table, a movable plate holder under said table adapted for movement longitudinally and transversely of said table, a tube holder above said table adapted for longitudinal and transverse movement with respect to said table, said tube holder being adapted to move oppositely in synchronism with the plate holder and means for imparting said motion which is opposite and synchronous to the plate holder, said means comprising a stationary templet, and a groove in said templet, said groove being of a parabolic type adapted to govern the path of target travel in such an X-ray tube as may be mounted in said tube holder so that the change in the area of the segments swept by the radius vector connecting the center of the X-ray tube target with the center of its movement is substantially equal for consecutive equal intervals of time.

10. In an X-ray apparatus, including a table, a movable plate holder under said table adapted for movement longitudinally and transversely of said table, a tube holder above said table adapted for longitudinal and transverse movement with respect to said table, said tube holder being adapted to move oppositely in synchronism with the plate holder and means for imparting said motion which is opposite and synchronous to the plate holder, said means comprising a stationary templet, and a groove in said templet, said groove being of a parabolic type adapted to govern the path of target travel in such an X-ray tube as may be mounted in said tube holder, so that the change in the area of the segments swept by the radius vector connecting the center of the X-ray tube target with the center of its movement is substantially equal for consecutive equal intervals of time, and an apertured shield for said tube holder mounted for simultaneous parallel movement therewith.

11. In a device of the character set forth, an X-ray tube support, a tube holder movably mounted on said support, a plate support, a plate holder movably mounted on said plate support, a link connecting said tube holder and said plate support, a link connecting said tube holder and said plate holder for moving said tube and plate holder simultaneously in opposite directions, a driving disk and a templet operatively connected to said disk said templet being adapted to govern the path to be followed by said tube holder and means connecting said tube holder and said link to maintain said tube holder in a direction insuring the impingement of X-rays upon the plate holder during movement.

12. In a device of the character set forth, an X-ray tube support, a tube holder movably mounted on said support, a plate support, a plate holder movably mounted on said plate support, a link connecting said tube holder and said plate holder which moves said tube and plate holder simultaneously in opposite directions, a driving disk operatively connected with said tube holder, a templet operatively connected to said disk, said templet being adapted to govern the path to be followed by said link, and a releasable connector between said link and tube holder, to maintain the impingement of the X-ray beam upon the plate holder during movement.

13. In an X-ray apparatus, including a table, a movable plate holder under said table adapted for movement longitudinally and transversely of said table, an X-ray tube and a mounting therefor above said table adapted for longitudinal and transverse movement with respect to said table, a diaphragm under the table for said plate holder mounted for longitudinal movement with said plate holder and fixed against transverse movement with respect to said table.

14. In an X-ray apparatus, including a table, a movable plate holder under said table adapted for movement longitudinally and transversely of said table, a tube holder above said table adapted for longitudinal and transverse movement with respect to said table, a diaphragm for said plate holder mounted for longitudinal movement with said plate holder and fixed against transverse movement with respect to said table and means for imparting, simultaneously, opposite motion to said tube holder and said plate holder.

15. In an X-ray apparatus, including a table, a movable plate holder under said table adapted for movement longitudinally and transversely of said table, a tube holder above said table adapted for longitudinal and transverse movement with respect to said table, a diaphragm for said plate holder mounted for longitudinal movement with said plate holder and fixed against transverse movement with respect to said table, means for imparting, simultaneously, opposite motion to said tube holder and said plate holder and means for moving said tube holder and said plate holder, together, longitudinally of said table.

16. In an X-ray apparatus, including a table, an X-ray tube support, a rail upon which the said X-ray tube support is slidably mounted, a movable plate holder under said table, adapted for movement longitudinally and transversely of said table, a tube holder above said table mounted on said tube support for longitudinal and transverse movement with respect to said table, and to said support, an aperture shield for said tube holder mounted for simultaneous movement therewith, a diaphragm for said plate holder mounted for longitudinal movement with said plate holder and fixed against transverse movements with respect to said table, means for locking and unlocking said X-ray tube support to permit or prevent movement thereof with respect to said table, and means for imparting simultaneously opposite motion to said tube holder and plate holder.

17. In an X-ray apparatus including a table, an X-ray tube support, a rail upon which said X-ray tube support is slidably mounted, a movable plate holder under said table adapted for movement longitudinally and transversely of said table, a tube holder above said table adapted for longitudinal and transverse movement with respect to said table, an aperture shield for said tube holder mounted for simultaneous movement therewith, a diaphragm for said plate holder mounted for longitudinal movement with said plate holder and fixed against transverse movement with respect to said table, means for locking and unlocking said X-ray tube support to permit or prevent horizontal traverse and means for imparting rectilinear motion to said tube support parallel to said table simultaneously with all of the other motions recited.

18. In an apparatus including a table, an X-ray tube support, a rail upon which said X-ray tube support is slidably mounted, a movable plate holder under said table adapted for movement longitudinally and transversely of said table, a tube holder above said table adapted for longitudinal and transverse movement with respect to said table, an aperture shield for said tube holder mounted for simultaneous movement therewith, a diaphragm for said plate holder adapted to partake of all of the movements of said plate holder, means for locking and unlocking said X-ray tube support to permit or prevent horizontal traverse and means for imparting rectilinear motion to said tube support parallel to said table simultaneously with all of the other motions recited.

19. In a device of the character described, a movable X-ray tube support, a tube holder movably mounted on said tube support, a plate support, a plate holder movably mounted on said plate support, means comprising a weighted unbalanced pulley and a cable thereon, said cable being releasably connected to said tube support whereby the rotation of said pulley will cause a movement of said X-ray tube support and means connecting said tube holder and said plate holder and adapted to compel said plate holder to move in an opposite direction to the movement imparted to said tube holder in consequence of movement imparted to said tube support as a result of the rotation of said unbalanced pulley.

20. In an X-ray apparatus, a movable X-ray tube support, a tube holder movably mounted on said support, a plate support, a plate holder movably mounted on said plate support, means connecting said tube holder and plate holder which means are adapted to compel said tube holder and plate holder to move in an opposite direction to the movement imparted to said tube support, said means comprising an unbalanced pulley and a cable thereover, said cable being releasably connected to said tube support whereby the rotation of said pulley will cause a movement of said X-ray tube support.

21. A method of roentgenographic projection of plane sections of solid objects which includes the step of subjecting the body to radiations from a source of emanation which is moving in a single plane with spiral motion and simultaneously therewith moving a radiographic film on the opposite side of the body in a parallel plane with similar movement 180 degrees out of phase.

22. A method of roentgenographic projection of plane sections of solid objects which includes the step of subjecting the body to radiations from a source of emanation which is moving in a single plane with spiral motion of such configuration that the density of rays will be uniform over the entire receiving area of the body and simultaneously therewith moving a radiographic film on the opposite side of the body in a parallel plane with similar movement 180 degrees out of phase.

23. A method of roentgenographic projection of plane sections of solid objects which includes the step of subjecting the body to radiations from a source of emanation which is moving in a single plane with spiral motion of such configuration that the change in the area of the segments swept by the radius vector connecting the center of the source of emanation with the center of its movement is substantially equal for equal consecutive equal intervals of time and simultaneously therewith moving a radiographic film on the opposite side of the body in a parallel plane with similar movement 180 degrees out of phase.

JEAN KIEFFER.